June 21, 1938. F. A. EICHEL 2,121,522
CAR SEAT
Filed April 23, 1936 2 Sheets-Sheet 1

INVENTOR
Frank A. Eichel
BY
ATTORNEYS

June 21, 1938.  F. A. EICHEL  2,121,522
CAR SEAT
Filed April 23, 1936  2 Sheets-Sheet 2
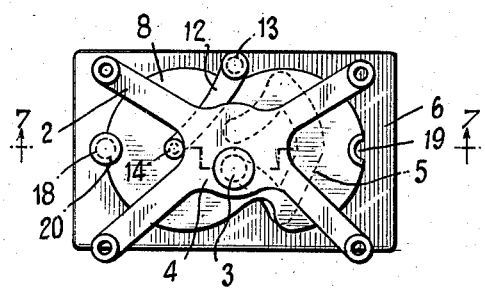
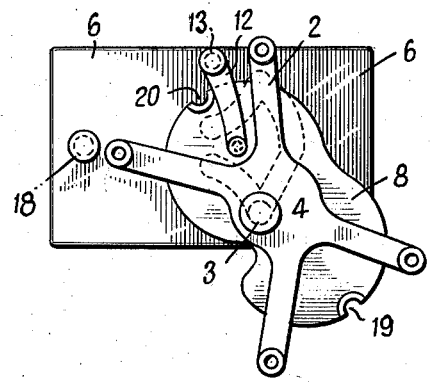
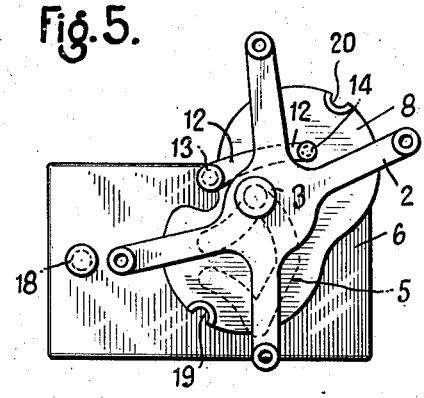
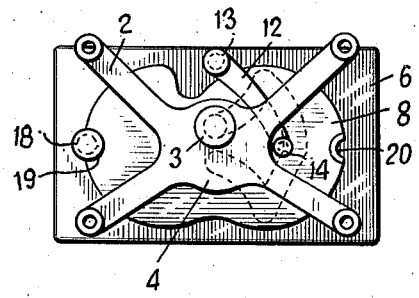
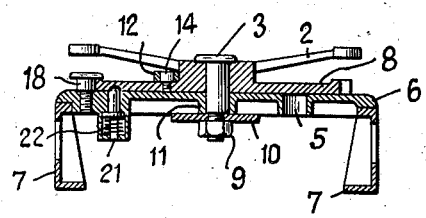
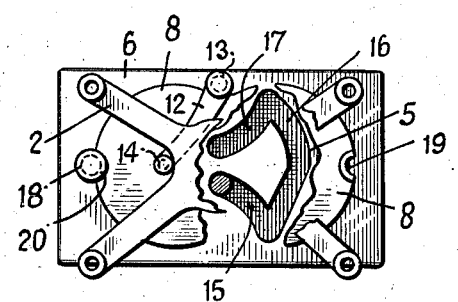
INVENTOR
Frank A. Eichel
BY
ATTORNEYS Patented June 21, 1938

2,121,522

UNITED STATES PATENT OFFICE 2,121,522

CAR SEAT

Frank A. Eichel, New York, N. Y., assignor to Thomas Lamb, New York, N. Y.

Application April 23, 1936, Serial No. 75,935

1 Claim. (Cl. 155—96)

This invention relates to seats for railway cars and the like in which it is desirable to reverse the direction of the seat from time to time in order to permit the passenger to face forward.

In the conventional type of reversible car seat, the back has usually been made as a separate unit, adjustable with respect to the horizontal portion of the seat so that the seat could be made to face either forward or backward.

In recent years, in response to a demand for more comfort in car seats, a type of seat has been developed in which the back and horizontal portion of the seat, together with the arms thereof are formed as a unit, and in which the entire seat structure is turned as a unit when it is desired to reverse the direction of the seat.

It is an object of the present invention to provide a support for such seats which will permit them to be turned with a minimum amount of clearance from the side wall of the car and from adjacent seats, taking advantage of the aisle space for portions of the turning movement.

Other objects and advantages of the invention will appear hereinafter.

A preferred embodiment of the invention selected for purposes of illustration is shown in the accompanying drawings, in which, Figure 1 is a front elevation of the seat.

Figure 3 is a top plan view of the reversing mechanism, the seat unit being removed.

Figures 4, 5 and 6 are similar views illustrating successive stages of the reversing movement.

Figure 7 is a section on the line 7—7 of Figure 3, and

Figure 8 is a view similar to Figure 3, with parts broken away to show the shape of the cam track.

Figure 1:
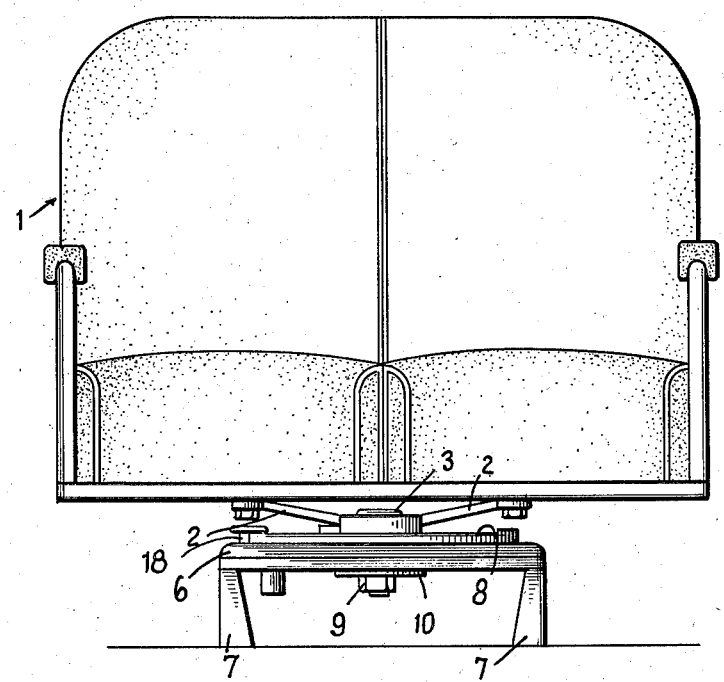
Figure 2:
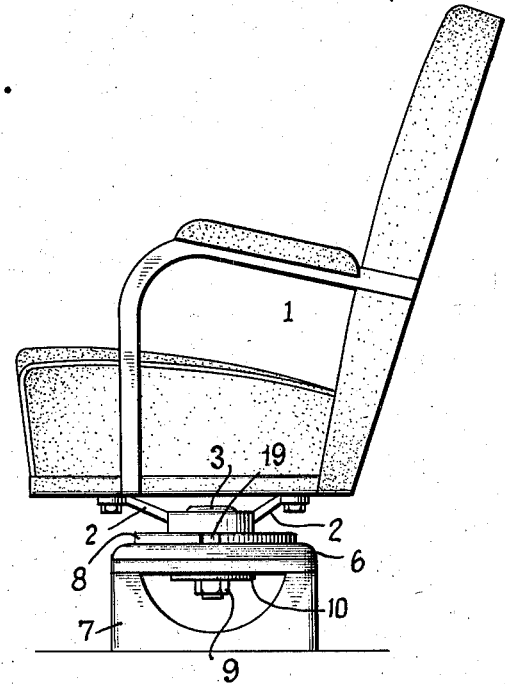
Figure 2 is an end elevation.

Referring to the drawings, the unitary seat structure 1 is secured to a spider 2 having a guide pin 3 passing through its central web portion 4 and extending downwardly through the cam slot 5 formed in the stationary bed plate 6 which may be supported at any convenient height above the floor by leg members 7. A flat bearing plate 8 is formed integrally with the spider 2 and is provided with a flat lower surface which rests on the flat upper surface of the bed plate 6. The spider and bearing plate unit is held against the bed plate by the nut 9 and washer 10 which bears against the edges of the depending flanges 11 of the cam slot 5, sufficient play being allowed, however, to permit the guide pin 3 to move freely in the cam slot.

The cam slot 5 is preferably shaped as illustrated in Figure 8, and as shown therein is roughly in the shape of a triangle, so as to permit travel of the guide pin along the cam slot in three major directions. Thus the cam slot comprises the leg portion 15 connecting with the base portion 16 which in turn connects with a second leg portion 17. Preferably each of the portions 15, 16 and 17 of the cam slot are arcuate, the leg portions 15 and 17 being formed to provide similar but reversely curved concave sides to the triangle, while the base portion 16 provides a convex base therefor. Also while the precise contour of the cam slot may be varied somewhat in practice to meet specific conditions which arise in the installation of seats in cars, it is generally preferable that the base portion 16 be longer than the leg portions 15 and 17.

A link 12, which may be called the control link, is pivotally connected at one end to the bed plate 6 by pin 13, and is pivotally connected at the other end to the bearing plate 8 by pin 14. The pin 13 is preferably located substantially in alignment with the terminal portions of the cam slot, and the pin 14 is preferably so located on the bearing plate that in either of the final positions of the seat it will be equidistant from the two terminal portions of the cam slot.

Thus, starting from the position illustrated in Figure 3, when it is desired to reverse the direction of the seat, so as to bring it to the position illustrated in Figure 6, the seat is manipulated by the operator to cause the pin 3 to travel along the cam slot, first along the portion 15, then along the portion 16, then along the portion 17 until the pin arrives at the end of portion 17 as indicated in Figure 6. At the same time, the provision of the control link 12 causes a turning movement of the seat around the pin 14 as a movable pivot, the position of the pivot being shifted, of course, as the guide pin travels along the cam slot. Figures 4 and 5 indicate intermediate stages of the turning movement.

It will be understood that even without the provision of the link 12 the desired turning movement may be accomplished by the operator, if, as the pin 3 is moved along the cam slot to cause the desired translation of the seat, the operator also rotates the seat at the proper time, as is entirely possible, particularly if the operator is familiar with the required motion. The purpose of the control link is to positively insure that the rotation of the seat will be properly coordinated with the translation thereof, in order to avoid interference with adjacent seats, even when operated by inexperienced persons.

It will be observed that the pin 3 is offset somewhat from the longitudinal medial line of the spider. This is done because it is desirable that the terminal portions of the cam slot be offset or spaced somewhat in order to avoid any possibility that in reversing the seat, the guide pin might be caused to begin its travel along the wrong portion of the cam slot. By offsetting the pin 3 a similar distance, the seat will occupy a similar relative position with respect to the base in either of its final positions.

If desired, a pin 18 may be mounted in the bed plate 6 to cooperate with notches 19 and 20 in the bearing plate 8 in order to hold the seat in its two positions of adjustment. If desired, this holding means may be supplemented by the pin 21, which is urged upwardly into engagement with suitable notches in the bearing plate 8 by the spring 22. Any conventional means may be employed for tripping the pin 21, or by properly shaping the end of the pin and the notches in the bearing plate, the pin may be automatically released when the operator starts to turn the seat.

It will be understood that the invention may be variously modified and embodied within the scope of the subjoined claim.

I claim as my invention:

In a reversible seat, in combination, a stationary bed plate, a movable bearing plate, a cam track in said bed plate, a guide pin mounted in said bearing plate and extending into contact with said cam, said guide pin serving to guide the translation of said bearing plate along the path of said cam, a link having one end pivoted in said bed plate and its other end pivoted in said bearing plate, and serving to cause rotation of said bearing plate about said guide pin as an axis as it is moved along said cam track, the pivot in said bed plate being located in alignment with the terminal portions of said cam track, and the pivot in said bearing plate being equidistant from said terminal portions in either of the final positions of said seat.

FRANK A. EICHEL.